US006761924B2

(12) United States Patent
Kaiser et al.

(10) Patent No.: US 6,761,924 B2
(45) Date of Patent: Jul. 13, 2004

(54) FOOD MATERIALS WITH IMPROVED FLAVOR AND FUNCTIONALITY DUE TO SIZE REDUCTION IN A MODIFIED ATMOSPHERE

(75) Inventors: John M. Kaiser, Manheim, PA (US); Ilene Cooper, Mt. Joy, PA (US); Gagan Mongia, Elizabethtown, PA (US); Kenneth G. Weaber, Jr., Lancaster, PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 10/270,615

(22) Filed: Oct. 16, 2002

(65) Prior Publication Data

US 2003/0118708 A1 Jun. 26, 2003

Related U.S. Application Data

(62) Division of application No. 09/660,347, filed on Sep. 12, 2000, now Pat. No. 6,521,278.

(51) Int. Cl.$^7$ ................................................. A23G 1/00
(52) U.S. Cl. .................... 426/631; 426/588; 426/593
(58) Field of Search ................................. 426/473, 518, 426/588, 593, 631; 241/24.16

(56) References Cited

U.S. PATENT DOCUMENTS

| | | |
|---|---|---|
| 1,542,884 A | 6/1925 | Hollstein |
| 2,900,256 A | 8/1959 | Scott |
| 3,014,802 A | 12/1961 | Hellman et al. |
| 3,293,771 A | 12/1966 | Lawrence et al. |
| 3,423,031 A | 1/1969 | Merges et al. |
| 3,769,030 A | 10/1973 | Kleinert |
| 3,868,469 A | 2/1975 | Chalin |
| 3,965,267 A | 6/1976 | Davis |
| 4,086,371 A | 4/1978 | Minifie et al. |
| 4,089,259 A | 5/1978 | Stickle et al. |
| 4,224,354 A | 9/1980 | Szegvari |
| 4,281,027 A | 7/1981 | Inoue et al. |
| 4,335,153 A | 6/1982 | Rikon et al. |
| 4,377,601 A | 3/1983 | Dreese et al. |
| 4,564,525 A | 1/1986 | Mitchell et al. |
| 4,622,233 A | 11/1986 | Torres |
| 4,640,839 A | 2/1987 | Hsu |
| 4,810,516 A | 3/1989 | Kong-Chan |
| 4,863,753 A | 9/1989 | Hunter et al. |
| 4,915,967 A | 4/1990 | Nozaka |
| 4,915,972 A | 4/1990 | Gupta et al. |
| 4,963,372 A | 10/1990 | Zumbe |
| 4,981,535 A | 1/1991 | Hadermann et al. |
| 5,197,680 A | 3/1993 | Chauveau |
| 5,342,636 A | 8/1994 | Bakshi et al. |
| 5,352,471 A | 10/1994 | Kusano et al. |
| 5,441,753 A | 8/1995 | McGinley et al. |
| 5,464,649 A | 11/1995 | St. John |
| 5,490,999 A | 2/1996 | Villagran et al. |
| 5,505,982 A | 4/1996 | Krawczyk et al. |
| 5,626,900 A | 5/1997 | Miller |
| 5,672,373 A | 9/1997 | Miller |
| 5,676,995 A | 10/1997 | Cully et al. |
| 5,695,130 A | 12/1997 | Csendes |
| 5,709,903 A | 1/1998 | St. John |
| 5,776,536 A | 7/1998 | Tremblay et al. |
| 5,882,709 A | 3/1999 | Zumbe |
| 5,887,803 A | 3/1999 | Dietrich et al. |
| 5,888,430 A | 3/1999 | Wakayama et al. |
| 5,906,847 A | 5/1999 | Engel |
| 5,948,170 A | 9/1999 | Yli-Kyyny |
| 5,976,276 A | 11/1999 | Sapru et al. |
| 5,989,619 A | 11/1999 | Zumbe |
| 5,993,873 A | 11/1999 | Kuslys et al. |
| 6,066,350 A | 5/2000 | Purtle et al. |
| 6,165,518 A | 12/2000 | Cain et al. |
| 6,287,616 B1 | 9/2001 | Beeson et al. |
| 6,296,891 B1 * | 10/2001 | Zumbe et al. ............. 426/631 |
| 6,521,278 B1 * | 2/2003 | Kaiser ........................ 426/473 |

FOREIGN PATENT DOCUMENTS

| | | |
|---|---|---|
| DE | 430 650 | 6/1926 |
| EP | 0 018 607 | 4/1980 |
| EP | 0 157 896 | 10/1985 |
| WO | WO 99/45789 | 9/1999 |

OTHER PUBLICATIONS

Jürgen Buchmüller et al., "Liquid Nitrogen, A Versatile Cooling Agent in Comminution and Mixing Processes", Fleischwirtsch, 1989, vol. 69, No. 4, pp. 597–598.

"Spice Technology Puts Flavors in Deep Freeze", Prepared Foods, Nov. 1990, p. 83.

C. T. Murthy et al., "Effect of Grinding Methods on the Retention of Black Pepper Volatiles", J. Food Sci. Technol. 1996, vol. 33, No. 4, pp. 299–301.

* cited by examiner

*Primary Examiner*—Carolyn Paden
(74) *Attorney, Agent, or Firm*—Fitzpatrick, Cella, Harper & Scinto

(57) ABSTRACT

Off-notes normally associated with chocolates made from ingredients containing dairy powders can be avoided using a dry mill in connection with a modified atmosphere to reduce the particle sizes of the ingredients. The modified atmosphere may be air at a temperature of about 65° C. to about 120° C., or an atmosphere having less than about 5.0 percent oxygen.

4 Claims, 2 Drawing Sheets

FOOD MATERIALS WITH IMPROVED FLAVOR AND FUNCTIONALITY DUE TO SIZE REDUCTION IN A MODIFIED ATMOSPHERE

This application is a divisional of U.S. patent application No. 09/660,347, filed Sep. 12, 2000, now U.S. Pat. No. 6,521,278 which is incorporated by reference herein.

BACKGROUND OF THE INVENTION

1. Field of the Invention

The invention relates to food processing and to methods and systems for particle size reduction of edible starting materials. Specifically, the invention utilizes dry milling for the particle size reduction with either an unreactive ambient atmosphere circulating in a closed loop, or an increased temperature atmosphere. The methods and systems of the present invention may be used to produce novel chocolate products free of off-notes.

2. Description of the Related Art

The smooth mouthfeel of chocolate depends to a large extent on the size of the chocolate solids contained in a recipe. Large particles, exceeding 50 to 60 microns, for example, impart a gritty texture not normally viewed as acceptable. This requirement makes particle size reduction a critical step in chocolate making.

The traditional method of making chocolate employs a 2, 3, or 5 roll refiner for reducing the size of a paste containing sugar, milk, chocolate liquor and fat. Cocoa butter, milk fat, or a combination of these, may be used depending on the desired recipe. Agitated ball mills, stone mills and refiner conches have also been used. All of these wet grinding apparatus are known to be labor intensive to operate and expensive to maintain.

In recent years, as consumers have demanded lower fat content chocolates, the roll refiner has met with limitations. International Application WO 99/45789, incorporated by reference herein in its entirety, discloses using particle size control to obtain chocolates having fat content below about 25 weight percent.

Dry milling of chocolate ingredients in an air-jet mill, air classifying mill, hammer mill, or the like, permits improved particle size control. Even for conventional recipes having greater than 25 percent fat, dry milling provides rheological advantages, as disclosed in V. Eynck, "Dry Grinding and Mixing of Compound Coatings," 43$^{rd}$ P.M.C.A. Production Conference (1989), pp. 35–38.

In view of the foregoing, it would be desirable to move toward dry milling of chocolate and chocolate precursors from the standpoint of efficiency, cost and finished product quality.

However, dry milling has been found to lead to loss of desirable flavors and in many cases to the development of off-notes. These off-notes are flavors not normally found in chocolate and generally seen as undesirable. The inventors have discovered several off notes arising in the dry milling of chocolate ingredients, including "metallic," "fishy," "cardboard," "wet-dog" and "rancid" notes that can carry over to chocolate made from these ingredients. The extent of the off-note intensity has been linked to the source of the raw materials. Dairy powders derived from milk of pasture-fed cattle appear to have a greater propensity to develop these undesirable flavors. This has severely limited the use of dry milling for widespread chocolate manufacture. Without wishing to be bound by any theory of what is responsible for these phenomena, it is believed that exposing nonfat milk, whole milk, lactose, sugar (sucrose), cocoa, flavorings and combinations thereof to attrition in combination with high volumes of air is sufficient to create the objectionable off-notes.

The solution to the problem of off-notes has proven to be elusive. Addition of very effective natural and synthetic anti-oxidants including TBHQ, BHT, BHA, and vitamin E to a dry mix of powders prior to milling has no significant impact on the off-note generation.

International Application WO 93/19629 discloses a method of preserving foods using noble gases. With regard to chocolate, the method entails contact, and preferably the saturation of, chocolate with a noble gas such as argon, at any stage, and preferably at every stage of chocolate production. The above International Application does not disclose or suggest dry milling of chocolate ingredients.

SUMMARY OF THE INVENTION

This invention is directed to methods and systems for manufacturing powdered edibles free of off-notes. The invention allows for the integration of dry milling into the production of chocolate in a continuous process without using a roll refiner.

A method according to one embodiment of the invention comprises feeding an edible composition comprising milk powder and containing less than about 15 percent fat through a dry mill in continuous contact with air having a temperature between about 65° C. and about 120° C. to produce reduced-size particles, and recovering the reduced-size particles. In a more preferred embodiment, the exit temperature of the dry mill (dry mill exit temperature) is between about 68° C. and about 85° C. In the most preferred embodiment, the dry mill exit temperature is between about 70° C. and about 75° C.

In a preferred embodiment, the dry mill used with the system is an air classified mill which reduces the particle size of the starting material to between about 10 and about 60 microns. After particle size reduction, the particles may be combined with chocolate liquor, cocoa butter and other materials to make chocolate. When referring to particle size herein, the measurements were taken using a micrometer.

In preferred chocolate-manufacturing embodiments, the starting material comprises a milk powder and contains between about 0.08 weight percent and about 12 weight percent fat, and the particles obtained are free of off-notes. In preferred embodiments the starting material contains between about 10 and about 12 percent fat.

In another embodiment, the system of this invention includes a closed gas circulation loop containing a circulating gas; a fan to circulate gas continuously throughout the closed gas circulation loop; a source of substantially unreactive gas operatively connected to the gas circulation loop; a damper to control the addition of the substantially unreactive gas to the circulating gas; a source of edible starting material; a dry mill operatively connected to the source of edible starting material to reduce the particle size of the edible starting material to form product particles; and a gas-solid separator to recover the product particles from the circulating gas. In a preferred embodiment, the edible starting material and the product particles are continuously contacted with said circulating gas.

A preferred method of making chocolate using the above-described closed system comprises providing a substantially unreactive gas to the closed system, feeding a composition comprising chocolate liquor, powdered milk product and sugar and containing less than about 15 percent fat through a dry mill in contact with the circulating gas to produce particles, recovering the particles from the circulating gas, and combining the particles with cocoa butter, additional chocolate liquor and other ingredients to make chocolate.

DETAILED DESCRIPTION OF THE PREFERRED EMBODIMENTS

Figure 1:
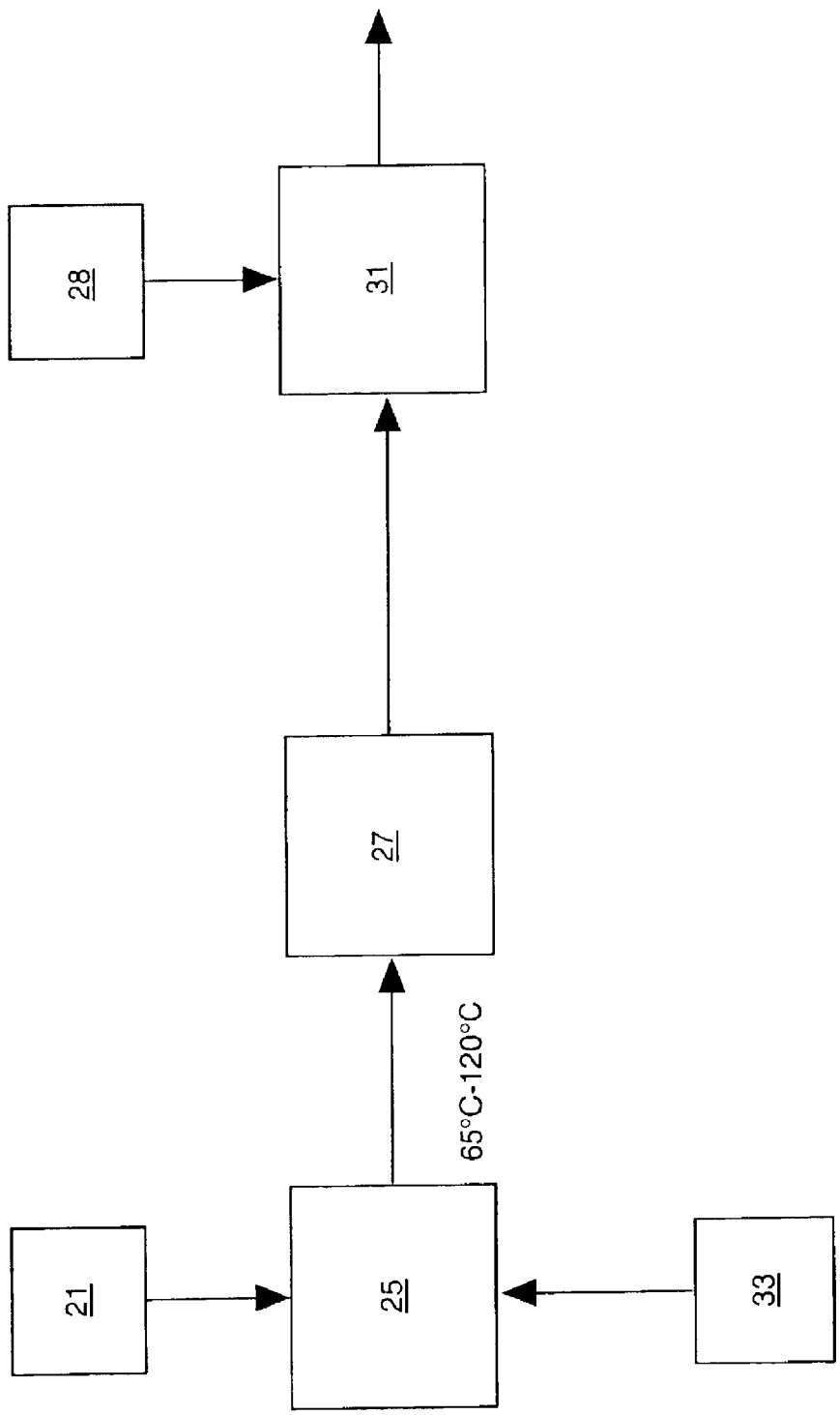
FIG. 1 is a diagram of an open-loop system according to the invention.

"Air classified mill" and "classified mill" are used interchangeably herein to refer to a particle size reduction unit in which particles are borne by air or other gas, and in which sorting by particle size occurs in the particle size reduction unit as a result of gravitational forces.

The term "chocolate" is intended to refer to all chocolate or chocolate-like compositions with a fat phase or fat-like composition. In the United States, chocolate is subject to a standard of identity (SOI) established by the U.S. Food and Drug Administration under the Federal Food, Drug and Cosmetic Act. Definitions and standards for the various types of chocolate are well established in the U.S. Non-standardized chocolates are those chocolates which have compositions which fall outside the specified ranges of the standardized chocolates. The term "chocolate," as used herein, is intended to include standardized and non-standardized chocolates, i.e., including chocolates with compositions conforming to the SOI and compositions not conforming to the SOI, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions. Chocolate also includes products containing crumb solids or solids fully or partially made by a crumb process. Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the FDA standards of identity of chocolate or combinations thereof. For the chocolate made according to the invention the only critical characteristic is that it be made with a dry milled precursor having a fat content less than about 15 percent, and that it is substantially free of off notes.

"Chocolate precursor" as used herein means a dry milled powder that can be combined with other ingredients to make chocolate.

"Closed loop system" as used herein means a system substantially closed to outside air. It will be understood that some air enters with the feed, and from other incidental sources.

"Dry milling," as used herein, means particle size reduction of materials having a fat content less than 15 percent, in which the particles are surrounded by a modified atmosphere during the particle size reduction. In dry milling, as used herein, particles are entrained in a flow of the modified atmosphere during one or more stages of the particle size reduction, requiring separation of the particles from the flow. Dry milling apparatus that may be used in the step of dry milling according to the invention include, but are not limited to: air classified mills; hammer mills, with or without screens or other internal classification; pin mills; media mills; fluid energy mills; disk mills; and stone mills. A preferred dry milling apparatus for use with the present invention is an air classified mill.

"Milk powder," as used herein, includes skim milk powder, whole milk powder, blends, buttermilk powder, whey powder and lactose enhanced powders and enzymatically modified milk powders.

"Modified atmosphere," as used herein means either an atmosphere having an oxygen content of less than about 5 percent, and/or an atmosphere which has a temperature greater than about 65° C.

"Open system" or "open loop system" simply means that air from outside the system is used as a source of atmosphere in the dry mill. Of course, to produce an atmosphere having a temperature between about 65° C. and about 120° C. around the particles being milled, the air has to be heated. Therefore, the atmosphere is modified even though the outside air is used as a source of atmosphere.

It has surprisingly been found that a relationship exists between the temperature of the atmosphere surrounding edible particles subjected to dry milling, the oxygen content of the atmosphere and off-notes generated in the milled edible powders. On one hand, the generation of off-notes can be prevented by providing a reduced-oxygen ambient atmosphere. At low temperatures, between about 10° C. and about 25° C., an oxygen content in the atmosphere less than about 1 percent will prevent the generation of off-notes. At an intermediate temperature, between about 50° C. and about 60° C., off-notes can be prevented if the oxygen content of the atmosphere is maintained between about 2 percent and about 5 percent. In general, such reduced-oxygen atmospheres (less than 5 percent oxygen) are provided by continuously adding a make-up amount of substantially unreactive gas to a closed system having an atmosphere of predetermined composition, as will be described in greater detail below.

It has also been found that by operating at elevated temperatures (between about 65° C. and about 120° C.), edible particles can be dry milled in air (which has an oxygen content of about 21 percent) without off-notes being generated. At these elevated temperatures, an open system can be used without generating off-notes. The discovered relationship of temperature, oxygen content and off-notes is in some sense counterintuitive, as an increase in temperature would generally be associated with an increase in the reactions thought to generate off-notes in the first place.

Between about 60° C. and 70° C., it has been observed that the occurrence of off-notes is suppressed. It has been noted that this corresponds with the glass transition temperature of the sugars commonly included in the edible starting materials. Without intending to be bound by theory, there may be an association between these two events. A practical upper limit is placed on the temperature used in the open system by the browning or other adverse color changes that may occur at temperatures above about 120° C. The upper limit of temperature at which milling may take place in an open system without inducing browning is time-dependent. Browning may occur at lower temperatures if the residence time in the mill is longer. Therefore, the operational range is considered to be between about 65° C. and about 120° C. A preferred operating range is between about 65° C. and about 85° C. A most preferred range is between about 70° C. and 75° C.

The invention as embodied in an open loop system will now be described in connection with FIG. 1.

FIG. 1 is a flow diagram of an open system according to a preferred embodiment of the invention. Edible starting material is fed from hopper 21 to dry mill 25. Air is also provided in the dry mill from source 33. It will be understood that the air is simply drawn from outside the system, and the atmosphere source 33 may represent air conditioned by heating, humidifying or dehumidifying, as desired. It should be understood that hot air can be obtained by selecting a location where the air temperature is consistently elevated.

The edible starting material may comprise, for example, a confectionary ingredient, including sugar (sucrose), lactose, milk powder, cocoa, nutmeat, flavoring and combinations thereof, and included fats, such as cocoa butter, milk fat or other oils, and flavorings and could also include crumb. However, the starting material should not contain more than about 15 percent fat. The starting material preferably contains between about 10 percent and about 12 percent fat. In some embodiments, for example when skim milk powder is used, the fat content of the starting material can be as low as 0.08 weight percent.

Any edible starting material that might produce an off-note due to attrition and exposure to high volumes of air is suited for use with the invention. Preferably, the foodstuff is a constituent used in the manufacture of chocolate. Such constituents typically comprise sugar, such as sucrose, lactose, or a combination thereof, and whole milk or skim milk powders. The constituent may also contain chocolate liquor, oils, cocoa butter, salt, vanillin and other ingredients commonly found in chocolate. In a preferred embodiment, the methods and systems of the invention are advantageously applied to food products that contain non-U.S. origin milk products. These products are believed to be implicated in the formation of off-notes. Sources of non-U.S. milk powders include but are not limited to: Argentina, Australia, Canada, China, France, Ireland, New Zealand, Russia, and the United Kingdom.

A preferred dry mill according to both the open and closed loop embodiments according to the invention is an air classified mill. Although not customarily used in this context in chocolate manufacture, the basic design of an air classified mill is known in the art. An air classified mill typically constitutes a lower part and an upper part. The lower part comprises a grinding chamber with a rotor and hammers which contact and comminute the particles fed from the hopper. In the open system, conditioned air enters through an annular space in the lower part of the air classified mill and travels upward, carrying the particles into contact with the rotor and hammers of the grinding chamber and also the walls of the mill. The ground particles are sorted by size in the classifier vanes in the upper part of the air classified mill. Only the particles having the desired particle size continue on to the solid-gas separation stage 27. Larger particles remain in the mill as a result of the gravitational forces acting thereon, which is an advantage of the classified mill technology.

Preferably, the particle size of the powders leaving the air classified mill for use in chocolate compositions is in a range of about 10–60 microns. Most preferably the particle size of the powders leaving the air classified mill is between about 20 and about 40 microns. Particle size may be controlled by a fan determining the velocity of the air traveling through the mill. Alternatively, the speed of the grinding rotor or the classifier vanes can be modified to obtain the desired particle size. Suitable air classified mills for use with the present invention are available for example from Hosokawa Micron Powders Systems, Summit, N.J. The selection of an appropriate, commercially available model and its operating parameters would be within the skill of one of ordinary skill in the art.

Generally there is a temperature rise across a dry mill due to the mechanical action taking place therein. In the case of an air classified mill, the rise in temperature can range between about 15° C. and about 35° C., depending on the flow rate and particle size in the mill. In order to maintain an exit temperature between 65° C. and 120° C., the air entering the dry mill from source 33 should have a temperature in the range of about 30° C. to about 105° C. The relative humidity of the air entering the dry mill from source 33 is generally in the range of about 0 percent to about 25 percent. When a temperature of the modified atmosphere is specified herein, that is understood to refer to the exit temperature.

Recovery of the solid particles is accomplished in a gas-solid separator 27. If the dry mill is an air classified mill, a dust collector (baghouse) is advantageously used as the gas-solid separator. However, alternative gas-solid separators are known, and the selection, design, and operation of appropriate gas-solid separators would be readily apparent to one of ordinary skill in the art. At the pilot scale, recovery of the solid particles has been accomplished with a cyclone separator, which removes 90–95 percent of the particles, followed by a dust collector.

Chocolate precursor particles recovered from the gas-solid separator may be processed into chocolate by forwarding the precursor particles to a conche stage 31. In conche stage 31, the precursor particles are combined with a source of additional chocolate liquor and cocoa butter 28 and slowly kneaded at elevated temperatures. The time and temperature of the conche is dictated by the type of chocolate being produced.

Additional fat-containing ingredients include, without limitation, cocoa butter, chocolate liquor, milk fat, vegetable fat and fat substitutes. Preferably, the additional fat-containing ingredients are added within one to three hours of recovering the particles, more preferably within 15 minutes of recovering the particles.

Figure 2:
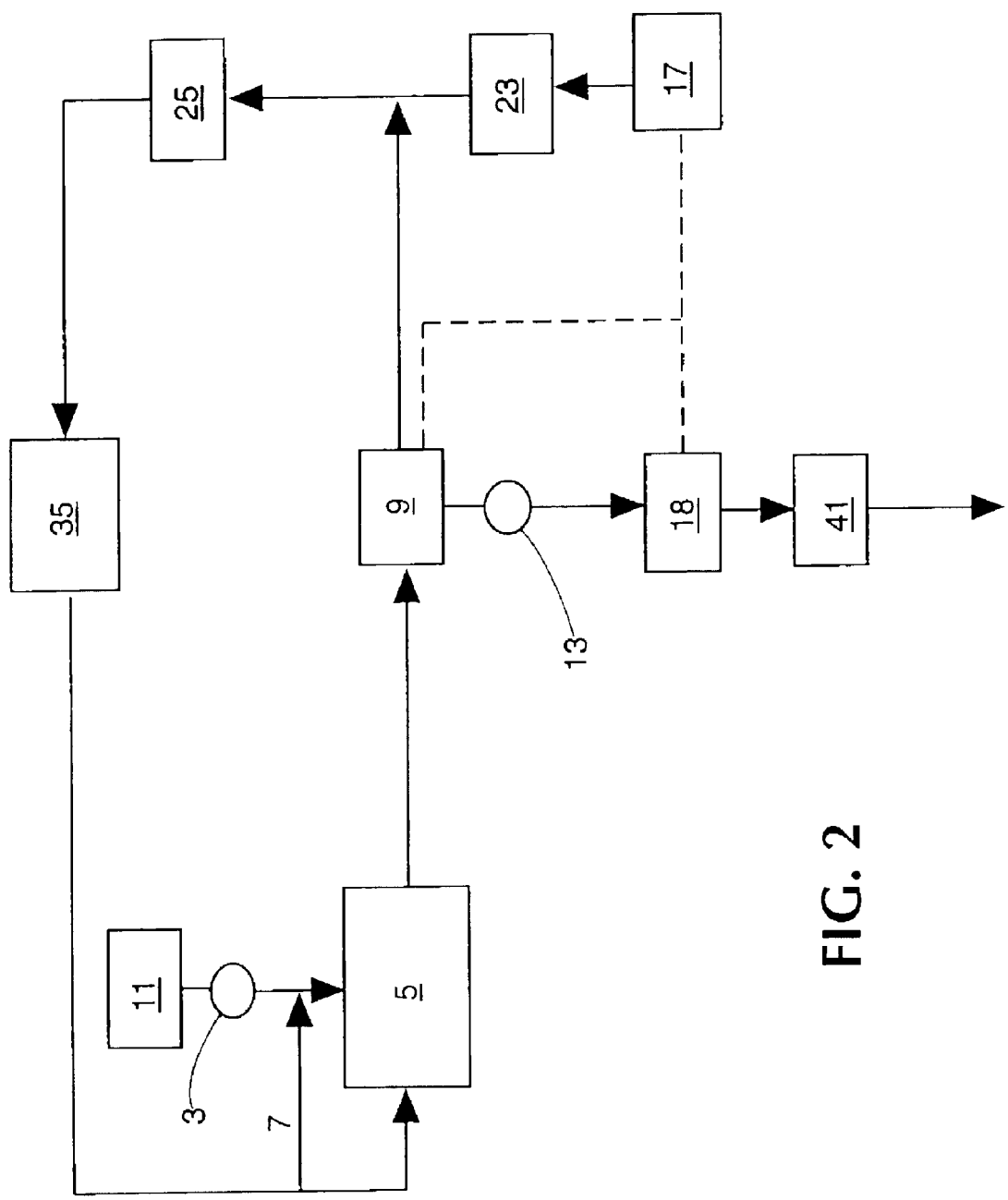
FIG. 2 is a diagram of a closed-loop system according to the invention.

FIG. 2 depicts a particle size reduction system according to a closed-loop embodiment of the invention. In the closed loop, a circulating gas having a substantially constant composition continuously circulates through the system. Preferably, to eliminate off notes, the circulating gas contains less than about 5 percent oxygen. Depending on the temperature, the circulating gas may contain less than 2 percent oxygen or less than 1 percent oxygen.

Edible starting material is fed from hopper 11 through rotary gate-lock 3 to a dry mill 5 to prevent outside air from infiltrating the closed loop system. Other means of feeding edible starting material to the mill that will inhibit the entry of outside air into the closed loop system, may also be used. For example, a screw feeder, or other alternatives known to those of ordinary skill in the art, may also be used.

A certain amount of air enters the closed gas-circulation system through the rotary gate-lock with the edible starting material. This addition affects the composition of the circulating gas, and is compensated for and controlled by the addition of a substantially unreactive gas, as set forth below. In preferred embodiments where the mill is an air classified mill, a side-stream of gas 7 may be diverted to entrain edible starting material as it is fed to the classified mill.

The selection and operation of an appropriate dry mill is described above in connection with the open loop system, except of course that a continuously circulating gas is used. Particles leaving the mill are directed to gas-solid separator 9 where they are recovered.

In a preferred embodiment, where the dry mill is an air classified mill, product particles borne from the top part of the mill are recovered in product collection area 19 at the bottom of the gas-solid separator through a gate-lock 13, which prevents the entry of outside air into the closed gas-circulation system.

Substantially unreactive gas from source 17 may be provided the product collection area 19 to ensure that the product particles are contacted by an unreactive environment throughout the process. In preferred embodiments, where the product particles comprise the constituent ingredients of chocolate, the product particles are incorporated with other ingredients to make chocolate precursor in a conching stage, preferably, within about 1 to about 3 hours of the particle size reduction in the dry mill.

Circulating gas exits the top of the dust collector (or other gas-solid separator) 9 and proceeds through fan 25. The damper 23 controls the composition of the circulating gas determining how much substantially unreactive gas is added to the closed gas-circulating system. The circulating gas preferably has an oxygen content less than 5 percent, less than 2 percent, or less than 1 percent. As noted above, there is a relationship between the operating temperature of the closed loop system, the oxygen content of the circulating gas, and the generation of notes. The cost of operating at lower oxygen levels must be assessed against the desirability of operating in a given temperature range.

The composition of the circulating gas is maintained by adding a substantially unreactive gas to the closed loop system. Substantially unreactive gas includes, without limitation, nitrogen, carbon dioxide, and noble gases, such as argon and xenon. Nitrogen is a preferred substantially unreactive gas.

If the substantially unreactive gas is nitrogen, any convenient source may be employed, such as a source of liquid nitrogen coupled with an evaporator. In larger scale facilities, nitrogen is preferably provided by a commercially available nitrogen generator using membrane or pressure swing adsorption technology. The nitrogen source used in the present invention is used for the purpose of controlling the ambient atmosphere to which the particles are exposed, and it is not necessary that the nitrogen provide cooling to the system. Nitrogen from source 17 may be routed to the top of the dust collector, the bottom of the dust collector, the product collection area 19 and to the inlet of damper 23, as desired.

Preferably, the closed gas circulation system is used in connection with the manufacture of chocolate, and when the product particles contain powdered milk products, the oxygen content of the system is below about 5.0 percent. Most preferably, under these circumstances, the oxygen content of the circulating gas stream is between about 0.1 percent and about 2.0 percent. Where possible, nitrogen addition to the system will be minimized, nitrogen being an expense. The nitrogen make-up requirements to maintain a given oxygen concentration in a closed gas-circulation system were observed to be generally about 0.7–1.0 percent nitrogen added to the circulating gas to maintain an oxygen concentration of 1.5 percent; about 1.5 percent nitrogen added to maintain an oxygen concentration of 1.0 percent; and about 2.5–3.0 percent nitrogen to maintain an oxygen concentration of 0.5 percent, where the percentages of added nitrogen given are with respect to the circulating gas flowrate. Of course, these requirements will differ depending on the design of the particular closed loop system.

Circulating gas, which will experience pressure drop and temperature rise through the mill 5, gas-solid separator 9, and fan unit 25, will be conditioned in gas conditioner 35 which may include a cooling coil and/or dehumidifier, as necessary. A pressure relief valve (not shown) may also be provided as an additional means of controlling the pressure in the system.

The closed loop gas circulation system is substantially sealed from the outside air and may have either a slightly positive or slightly negative pressure overall. Preferably, the entire system operates in the range of about 0 psi to about 1 psi (gauge), and is not expected to run at extremes of either positive or negative pressure. In operation, the pressure at the outlet of the fan may be slightly positive, while the pressure at the inlet of the classified mill to the inlet of the fan may be slightly negative. If the pressure in the system is slightly positive overall, outside air is prevented from leaking into the system. On the other hand, positive pressure inside the system may cause dusting as particles are entrained in escaping gas, and the escaping gas itself may present problems of safety and expense. As described above, dampers at the exit of the classified mill and at the exit of the fan control the pressure at those locations. Because nitrogen (or other inert gas) is an expense attendant with the methods and systems of the invention, care must be taken to prevent nitrogen leaks or ingress of outside gas into the system, where possible. The leakage areas of particular importance are the fan seal, dust collector, doors on the dust collector, and the pressure relief valve.

Prior to operating the closed loop system with a reduced-oxygen ambient atmosphere, the system is purged of air. The time necessary to purge a closed loop system has manufacturing implications. The rate of purging is limited by the volume of gas delivery and pressure rating for a given system, which in turn is usually dictated by the explosion diaphragm in the dust collector. A 1–5 psi burst pressure is typical.

Closed loop milling inherently has the potential to recycle flavors, as well as moisture, with freshly milled product. Flashing of small levels of moisture is believed to occur when an air classified mill is run on an open loop, (i.e. when an unreactive gas is not supplied, and the mill is run with a continuous supply of air.) If this moisture were observed to accumulate in the product in a closed-loop system, a drier/cooler could be added to the system as part of gas conditioner 35.

The inventors have found that closed-loop milling in a reduced-oxygen ambient atmosphere, below about 5.0 percent oxygen, eliminates off-notes in the milled powders. Nevertheless, certain undesirable flavors or notes may develop over time in edibles processed in the closed-loop classified mill particle size reduction system of the invention. The inventors have found that these late-developing notes can be avoided if they are processed into chocolate within about one to about 3 hours of particle size reduction.

Product collected at the base of the gas-solid separator may then be further processed to make foods such as chocolate. In some embodiments, the milled material is combined with cocoa butter, chocolate liquor and lecithin in conche stage 41. This combination may be performed in a pre-mixer, or the materials may be added directly to a conching stage. In either case, the refining step of the prior art, conventionally carried out in a roll refiner, is avoided using the dry milling apparatus according to the invention. After conching, the product may be tempered and crystallized to produce finished product, as would be apparent to one of ordinary skill in the art.

EXAMPLE 1

To demonstrate an open-loop system according to the invention, a chocolate precursor powder having the following composition was prepared by mixing the following ingredients in a D-300 mixer available from Hobart for 10 minutes at speed #1:

TABLE 1

| Ingredient | Mass (kg) |
| --- | --- |
| Sugar | 8.0 |
| Chocolate Liquor | 0.9 |
| Whole Milk Powder | 3.0 |
| Lactose | 1.0 |
| Vanillin | 0.0116 |

The above composition was milled in a 10 ACM air classified mill, commercially available from Blue Tech, Inc., Hickory, N.C. The mill was operated with a classifier speed of 2200 RPM, a rotor speed of 3800 RPM and a feed rate of 35 kg/hr to obtain particles having a nominal particle size of 40 microns. Air entering the classified mill had an inlet temperature of 75° C., and a relative humidity (before heating, at 10–15° C.) of 8 percent. Due to the small scale of the experiment, the inlet temperature was taken to be approximately equal to the exit temperature.

Milled powders were recovered in a gas-solid separation system and combined within fifteen minutes with further ingredients to make a chocolate recipe having the following composition:

TABLE 2

| Ingredient | Mass (kg) |
| --- | --- |
| Milled Powder (from Table 1) | 3.0 |
| Chocolate Liquor | 0.9 |
| Cocoa Butter | 0.5 |
| Lecithin | 0.023 |

Conching was performed in a nominal 10# Teledyne Readco sigma blade mixer for a 1.5 hour dry conche, followed by a 1 hour wet conche at a jacket temperature of 60° C. Chocolates were tempered in tablet form and stored at ambient temperature (20° C.).

At one week of age, the chocolates were melted and evaluated for the presence or absence of a fishy off-note. The results are tabulated below.

Comparative Examples 1–3

Chocolate powders were prepared as in Example 1, except that the inlet temperature to the air classified mill was set to 53° C., 60° C., and 67° C. for three different batches. The resulting chocolates were evaluated for the presence of off-notes. The results are tabulated below:

TABLE 3

| Example | Temperature (° C.) | Off-note present |
| --- | --- | --- |
| Ex. 1 | 75 | No |
| Comp. 1 | 53 | Yes |
| Comp. 2 | 60 | Yes |
| Comp. 3 | 67 | Slight |

It has been determined that because of the larger particle flow rates and lower volumes (proportionally) of air in contact with the particles experienced at the production scale, 65° C. is an appropriate exit temperature to avoid off-notes. A preferred dry mill exit temperature to avoid off notes is between about 68° C. and about 85° C.

To determine the flavor effect on a chocolate formulation using a variety of milk powders from U.S. and non-U.S. sources milled in a low oxygen environment using inert gas, chocolates were prepared using whole milk powders from U.S., Canadian, Australian, and Argentinian sources.

Samples of chocolates using these milk powders were prepared using "open loop" milling (Comparative Example 4) and "closed loop" milling (Example 2) for particle size reduction. In both cases, a pilot scale air classifier mill was used. In the "open loop" method, air freely passes through the entire milling system. In the closed loop system, the entire system is closed and purged with nitrogen until the oxygen level is reduced to about 1.0 percent. The particles are fluidized in the circulating nitrogen gas in the mill.

EXAMPLE 2

Two batches of the dry ingredients (10 kg sucrose, 4 kg whole milk powder (WMP), 2 kg lactose, and small amounts of salt and vanillin) were mixed in a Hobart model D-300 mixer at speed #1, 10 min., at ambient temperature.

Prior to milling each sample 25 kg of sugar is milled to insure that the mill is clean. After milling the sugar one of the batches is milled to further flush the mill. The second batch is then milled and the sample is taken for chocolate making.

The milling conditions for each different milk powder (Examples 2(a) to 2(d)) are listed below.

TABLE 4

| | Classifier (rpm) | Rotor (rpm) | Feed Rate (kg/hr) | % $O_2$ in mill | ACM Inlet Temp (° C.) |
| --- | --- | --- | --- | --- | --- |
| US WMP | 2500 | 3500 | 35 | 1.1 | 16 |
| Canadian | 2100 | 3500 | 35 | 1.4 | 18 |
| Argentina | 2200 | 3500 | 35 | 1.0 | 18 |
| Australia | 2200 | 3500 | 35 | 1.3 | 18 |

A total of 2.5 kg of the milled ingredients are added to a Teledyne Readco 6 quart Sigma lab mixer. 0.5 kg of cocoa butter, 1.0 kg of chocolate liquor, and 0.1 kg of anhydrous milk fat are melted and added to the milled material. The water jacket temperature remains at 50° C. This mixture is 'dry conched' at 50° C. for 1.5 hrs. At the end of the dry conche cycle 20 g of lecithin is added, the mixture is then 'wet conched' for one hour. The finished chocolate is hand tempered and molded into bars.

Comparative Example 4

The dry ingredients (10 kg sucrose, 4 kg whole milk powder (WMP), 2 kg lactose, and small amounts of salt and vanillin) were mixed in a Hobart model D-300 mixer at speed #1 for 10 minutes at ambient temperature. The mixture was milled to 40 μm using an air classified mill with air conditioned to 8 percent relative humidity and 15° C. The mill was set to operate using a classifier RPM of 2300, a rotor RPM of 4100 and a feed rate of 35 kg/hr. The milled ingredients were processed into chocolate in the same manner as described in connection with the immediately preceding Example 2.

Each chocolate produced using ingredients milled on the closed loop process were described by an expert panel as having typical chocolate attributes while those chocolates milled with air contained undesirable "wet-dog" or "fishy" attributes, and possessed lower chocolate intensity, as shown in Table 5 below.

TABLE 5

| Example | Oxygen Conc. | Off-note Present |
|---------|--------------|------------------|
| Ex. 2(a) | 1.1 | No |
| Ex. 2(b) | 1.4 | No |
| Ex. 2(c) | 1.0 | No |
| Ex. 2(d) | 1.3 | No |
| Comp. Ex. 4 | 21% (Air) | Yes |

Variations and modification of the disclosed invention will be apparent to those of ordinary skill in the art, and are within the scope of the invention as described in the appended claims.

What is claimed is:

1. A chocolate product substantially free of off-notes made by the process of:

dry milling edible starting material containing a milk powder and having a fat content less than about 15 percent by weight in a modified atmosphere to obtain a milled chocolate precursor and adding chocolate liquor and cocoa butter to said milled chocolate precursor within about three hours of obtaining said milled chocolate precursor.

2. The chocolate product of claim 1, wherein the modified atmosphere is air having a temperature between about 65° C. and 85° C.

3. The chocolate product of claim 1, wherein the modified atmosphere is a continuously circulating atmosphere having an oxygen content less than about 5.0 percent.

4. A chocolate precursor comprising chocolate liquor, a powdered milk product, and sugar, comprising between about 0.08 percent and about 12 percent by weight fat, and having particles with sizes between about 10 and about 60 microns, wherein said particles are milled in an atmosphere having an oxygen content less than about 5 percent or an atmosphere having a temperature greater than about 65° C.

* * * * *